United States Patent [19]
Williams et al.

[11] Patent Number: 5,429,831
[45] Date of Patent: * Jul. 4, 1995

[54] MARINATED MEAT AND POULTRY PRODUCTS HAVING A GLAZED COATING AND METHOD FOR PRODUCING SUCH PRODUCTS

[75] Inventors: Charles E. Williams, Moorefield, W. Va.; J. Leon Kusher, Creve Coeur, Mo.

[73] Assignee: Hester Industries, Inc., Moorefield, W. Va.

[*] Notice: The portion of the term of this patent subsequent to Jul. 10, 2007 has been disclaimed.

[21] Appl. No.: 869,063

[22] Filed: Apr. 16, 1992

Related U.S. Application Data

[60] Continuation of Ser. No. 516,906, Apr. 30, 1990, abandoned, which is a division of Ser. No. 233,377, Aug. 18, 1988, Pat. No. 4,940,590, which is a continuation of Ser. No. 129,941, Nov. 20, 1987, abandoned, Ser. No. 799,173, Nov. 18, 1985, abandoned, Ser. No. 798,964, Nov. 18, 1985, abandoned, and Ser. No. 804,581, Dec. 12, 1985, abandoned, which is a continuation-in-part of Ser. No. 669,854, Nov. 9, 1984, abandoned, said Ser. No. 129,941, is a continuation-in-part of Ser. No. 755,274, Jul. 15, 1985, abandoned, which is a division of Ser. No. 714,815, Mar. 22, 1985, abandoned, which is a continuation-in-part of Ser. No. 669,854, Mar. 22, 1985, said Ser. No. 799,173, is a continuation-in-part of Ser. No. 714,815, Mar. 22, 1985, said Ser. No. 798,964, is a continuation-in-part of Ser. No. 669,854, Mar. 22, 1985.

[51] Int. Cl.⁶ .................... A23L 1/31; A23L 1/315; A23L 1/318
[52] U.S. Cl. .................... 426/92; 426/103; 426/272; 426/293; 426/295; 426/296; 426/641; 426/644
[58] Field of Search ............ 426/281, 641, 644, 486, 426/289, 293, 296, 438, 241, 243, 519, 92, 96, 103, 272, 295, 302, 305

[56] References Cited

U.S. PATENT DOCUMENTS

| | | |
|---|---|---|
| 7,766 | 11/1850 | Starkweather . |
| 56,217 | 7/1866 | Harrison . |
| 474,466 | 5/1892 | Fey . |
| 1,033,269 | 7/1912 | Rawson . |
| 1,052,862 | 2/1913 | Trescott . |
| 1,557,779 | 10/1925 | Scheib . |
| 2,177,519 | 7/1936 | Doyle . |
| 2,502,115 | 3/1950 | Zimmerman . |
| 2,629,311 | 2/1952 | Graves . |
| 2,687,961 | 8/1954 | Ellis . |
| 2,761,786 | 9/1956 | George . |
| 3,006,767 | 10/1960 | Huckabee . |

(List continued on next page.)

FOREIGN PATENT DOCUMENTS

| | | |
|---|---|---|
| 880315 | 5/1980 | Belgium . |
| 884212 | 10/1971 | Canada . |
| 0172749A2 | 2/1986 | European Pat. Off. . |
| 2818862 | 11/1978 | Germany . |
| 86177 | 7/1976 | Japan . |

(List continued on next page.)

OTHER PUBLICATIONS

Novak, *Treasury of Chicken Cookery*, pp. 119–120, Mar.–1975, p. 130.
Tracy, *Complete Chicken Cookery*, pp. 48–49, Mar.–1954, Gp 130.
Chen, "Studies on the marinating of chicken parts for deep-fat frying", 47 *Journal of Food Science*, pp. 1016–1017, 1019 (1982).

(List continued on next page.)

*Primary Examiner*—Arthur L. Corbin
*Attorney, Agent, or Firm*—Nixon & Vanderhye

[57] ABSTRACT

Poultry parts are exposed to a marinade so that the marinade is absorbed by the parts and the outer surface of the parts has an adhesive myosin protein binder disposed thereon. The parts are then coated with a mixture including sugar to form a glazable outer coating, which coating glazes upon cooking.

38 Claims, 2 Drawing Sheets

U.S. PATENT DOCUMENTS

| | | |
|---|---|---|
| 3,036,533 | 5/1962 | Burt et al. . |
| 3,087,172 | 2/1963 | Libby . |
| 3,097,953 | 7/1963 | Humphreys . |
| 3,102,052 | 8/1963 | Ackles . |
| 3,140,183 | 7/1964 | Nack . |
| 3,149,554 | 9/1964 | Greenspan . |
| 3,166,427 | 1/1965 | Herrmann . |
| 3,208,856 | 9/1965 | Luker . |
| 3,294,009 | 12/1966 | Di Loreto et al. . |
| 3,347,679 | 10/1967 | Nordin . |
| 3,370,959 | 2/1968 | Moore et al. . |
| 3,387,979 | 6/1968 | Farha . |
| 3,514,294 | 5/1970 | Klug . |
| 3,522,058 | 7/1970 | Libby . |
| 3,552,978 | 1/1971 | Inklaar . |
| 3,582,350 | 6/1971 | Werbin . |
| 3,595,680 | 7/1971 | Fischer et al. . |
| 3,597,228 | 8/1971 | Jeppson et al. . |
| 3,649,438 | 3/1972 | Hopkins . |
| 3,653,924 | 4/1972 | Penton ............. 426/293 |
| 3,656,969 | 4/1972 | Horn . |
| 3,676,158 | 7/1972 | Fischer . |
| 3,704,135 | 11/1972 | Hale et al. . |
| 3,709,699 | 1/1973 | Hartmen et al. . |
| 3,723,137 | 3/1973 | Fischer . |
| 3,767,826 | 10/1973 | Fruin . |
| 3,769,027 | 10/1973 | Mangiere et al. . |
| 3,775,134 | 11/1973 | Michels et al. . |
| 3,917,860 | 11/1975 | Ayres et al. . |
| 3,928,634 | 12/1975 | Gasbarro ............. 426/281 |
| 3,945,311 | 3/1976 | Gasbarro . |
| 3,956,515 | 5/1976 | Moore et al. ............. 426/302 |
| 3,997,673 | 12/1976 | Strommer et al. . |
| 4,012,808 | 3/1977 | Strong ............. 426/644 |
| 4,038,426 | 7/1977 | Jespersen . |
| 4,045,584 | 8/1977 | Jones et al. . |
| 4,075,357 | 2/1978 | Szczezniak et al. . |
| 4,107,338 | 8/1978 | Tutor et al. . |
| 4,199,603 | 4/1980 | Sortwell, III . |
| 4,208,442 | 6/1980 | Evans et al. ............. 426/92 X |
| 4,214,518 | 7/1980 | Petsche . |
| 4,252,832 | 2/1981 | Moody . |
| 4,260,637 | 4/1981 | Rispoli et al. . |
| 4,265,766 | 5/1981 | Crossley . |
| 4,356,206 | 10/1982 | Boldt . |
| 4,356,762 | 11/1982 | Langen . |
| 4,367,242 | 1/1983 | Jarvis et al. . |
| 4,409,704 | 10/1983 | Seifhart . |
| 4,446,779 | 5/1984 | Hubbard et al. . |
| 4,458,586 | 7/1984 | Reed . |
| 4,473,592 | 9/1984 | Matthews et al. ............. 426/302 |
| 4,511,583 | 4/1985 | Olson et al. . |
| 4,518,618 | 5/1985 | Hsia et al. . |
| 4,588,600 | 5/1986 | Suderman ............. 426/535 |
| 4,721,623 | 1/1988 | Coffey et al. ............. 426/250 |
| 4,940,590 | 7/1990 | Williams et al. ............. 426/92 |

FOREIGN PATENT DOCUMENTS

| | | |
|---|---|---|
| 94256 | 6/1982 | Japan . |
| 7008821 | 12/1971 | Netherlands . |
| 413183 | 8/1934 | United Kingdom . |
| 2036531A | 7/1980 | United Kingdom . |
| 2059247 | 4/1981 | United Kingdom . |

OTHER PUBLICATIONS

Patent Abstracts of Japan, vol. 7, No. 242 (C-192) 27th Oct. 1983 and JP 58 58-129942 (Nitsutou Seifun).

Nagia, Junko "Browning Food Heated by Microwave Oven" (Tokyo Shibaura Electric Co.), 79 *Chemical Abstracts,* No. 13, Abstract No. 145058r (Dec. 1973) and JP-A-73 16 179.

Globus product brochure, "HS 3 Inject Star" Vari-o-vac product brochure.

Foldenauer product brochure, Foldenauer Equipment Company, Inc. 8585 South 77th Ave., Bridgeview, Ill. 60455.

*Food Processing,* p. 46, Aug. 1972.

*Food Processing,* pp. 56 & 68, Sep. 1972.

Suderman et al, "factors Affecting Adhesion of Coating to Poultry Skin: Effects of Various Protein and Gum Sources in the Coating Composition", 46 *Journal of Food Science,* (1981), pp. 1010–1011.

"Coatings, crumbs and batters", *Food Processing,* (Jun. 1984).

"Flavor line rubs products the right way", *Prepared Foods,* (Oct. 1988), p. 97.

"Keeping it Crisp", F O O D, (Dec. 1988), Lactosan (UK) Ltd., House, 5 Swinbourne Dr., Springwood Industrial Estate Braintree, Essex Cm77YP.

Duxbury, "Marinade/flavor/coating system for further processed poultry", *Food Processing,* (Jun. 1987), pp. 131–132, A Putman Publication; and.

Proctor et al, "Influence of Marinating on Weight gain and Coating Characteristics of Broiler Drumsticks", 52 *Journal of Food Science,* No. 2, (1987), pp. 286–289 and 293.

'84 Business Food Material Guide, Convenience Food Edition (Japan), p. 303 (plus partial translation).

Meat Processing Handbook (Japan, Nov. 20, 1980), pp. 285–289, 316 (plus partial translation.

MARINATED MEAT AND POULTRY PRODUCTS HAVING A GLAZED COATING AND METHOD FOR PRODUCING SUCH PRODUCTS

CROSS-REFERENCES TO RELATED APPLICATIONS

This application is a continuation of application Ser. No. 07/516,906 filed 30 Apr. 1990, now abandoned, which is a division of application Ser. No. 07/233,377 filed 18 Aug. 1988, now issued as U.S. Pat. No. 4,940,590, which is a continuation of the following commonly assigned United States patent applications, all now abandoned:

Application Ser. No. 07/129,941 filed Nov. 20, 1987, which is a continuation-in-part of application Ser. No. 06/755,274 filed Jul. 15, 1985, which is a divisional of application Ser. No. 06/714,815 filed Mar. 22, 1985, which is a continuation-in-part of application Ser. No. 06/669,854 filed Nov. 9, 1984;

Application Ser. No. 06/799,173 filed Nov. 18, 1985, which is a continuation-in-part of the above-referenced application Ser. No. 06/714,815;

Application Ser. No. 798,964 filed Nov. 18, 1985, which is a continuation-in-part of the above-referenced application Ser. No. 06/669,854, and Application Ser. No. 06/804,581 filed Dec. 12, 1985, which is also a continuation-in-part of the above-referenced application Ser. No. 06/669,854.

FIELD OF THE INVENTION

This invention relates to frozen precooked food products ready to warm and serve, and more particularly to unbreaded meat and poultry serving size portions of a dietary nature.

BACKGROUND OF THE INVENTION

Frozen food products including meat and poultry products prepared in serving portion sizes to be quickly heated and served have been long available, particularly in the institutional trades such as for use in fast food restaurants.

There is now a trend towards and a need for dietary foods that are low in fats and starches. This results in a significant problem in producing an acceptable appetizing looking meat product such as poultry which can be prepared simply by oven warming in a microwave oven for example (rather than by deep frying with breading or batter on the outside) to produce an acceptable golden brown or roasted poultry type of appearance.

Microwave ovens quickly and efficiently heat meats, but the meats are braised, browned or colored by the heating to have an appetizing appearance. For this reason, acceptable meat and in particular poultry products which can be stored in the frozen state for preservation have in the past been breaded for deep frying in oil. A significant part of the function of the breading is cosmetic, and in general the breading must be fried to produce a pleasing and appetizing golden brown color. However, this could result in a loss of control of taste and flavoring intensity. It may not be incidental that the cost and weight of the breading is less than that of the meat or poultry. Also, the breading can serve as a carrier of spices or flavorings.

In view of the demand for precooked products that need only be warmed prior to serving, the demand for light and low calorie foods, and dietary restrictions against fats, both the breading and the frying steps are at times unacceptable. Also, the flavored breading is just that and is not product flavoring. Furthermore, it is very difficult to provide breadings that will survive cooking, freezing and reheating cycles normal for frozen precooked foods. Should the breaded foods be cooked or warmed in ways other than frying, they lose their appetizing appearance, particularly if cooked or warmed in microwave ovens (which do not naturally brown the outer surfaces). Diet conscious meal planners complain that such foods contribute higher calorie content and contain excessive fats. Furthermore, the breading detracts from the meat or poultry flavor and texture.

It has thus not been feasible in the prior art to provide an unbreaded frozen product which when warmed to serving temperature in an oven, rather than in hot grease, has acceptable appearance and taste. Acceptable methods of coating and flavoring commercially produced poultry products so that they have a natural appearance and have special spices and flavors permeated into the meat instead of merely in the outer breading crust have not been available in the past.

Even if the foregoing problems could be solved, it is not known how to season the meat and poultry prior to freezing and cooking with spices and flavorings which will remain intact during initial preparation in the frozen state and after warming. Such flavorings previously have been included in breading formulas for deep fat frying. It is desirable to provide product lines of preflavored frozen meats and poultry with consistent quality control and flavor themes.

Furthermore, the internal meat texture and flavor impacts the quality of the products and must be controlled, For example, a turkey or chicken breast may become dry and unpalatable due to freezing since freezing and storage tends to dehydrate meat. Also, it is desirable to provide flavoring, tenderizer or seasoning internally to the meat and poultry products. This has been conventionally done in the past to cured meat products, such as ham and bacon. For home cooking, there are now marinades and tenderizers available for processing meats before cooking. However, these are inconsistent with fast food preparation and quality control uniformity. In particular, they are inconsistent with a factory applied outer coating of flavors and spices, such as those which might be desirable for imparting such flavors as curry, cheese, barbecue, for the production of specialty product lines for theme restaurants or personal flavor preferences, or merely to provide a variety of choices.

It is known to marinate meats and poultry to improve texture and flavor. It has been the practice to marinate meat and poultry products by tumbling in a marinade solution and applying reduced pressure during the tumbling, as shown for example by U.S. Pat. No. 7,766 to G. Starkweather issued Nov. 5, 1850—which also teaches exposing the meat alternately to brine and reduced pressure air atmospheres to cure, tenderize and flavor the meat. Vacuum massaging of meats and poultry in marinades is so commonplace now that many vendors supply chambers for locating at restaurants and like places. The trademarked "HS 3 Inject Star" automatic vacuum massage system is available from Globus Laboratories, Inc., 4 Gannett Drive, White Plains, N.Y. 10604. Typical tumbling equipment used in methods for flavoring and coating meat products is set forth in aforesaid Starkweather patent showing a simple tumbler and in U.S. Pat. No. 3,595,680 to L. G. Fischer et al issued Jul. 27, 1971 showing a more complex tumbler.

Tumblers are currently available from many manufacturers for use in the meat industry. Other examples of marinating equipment for meat and poultry include U.S. Pat. No. 3,928,634 to G. Gasbarro issued Dec. 23, 1975; U.S. Pat. No. 4,012,808 to W. Strong issued Mar. 22, 1977; and U.S. Pat. No. 4,265,766 to L. Crossley issued May 5, 1981. Gasbarro U.S. Pat. No. 3,928,634 teaches that the amount of marinade solution absorbed by the meats or poultry is a function of the exposure time, the degree of agitation in a tumbler, the strength of the marinade solution, and the amount of reduced pressure within a closed tumbling chamber. This interrelationship of complex variables, however, is inconsistent with the desire to produce uniform and consistent products, no matter what the flavor or marinade is, through simple and certain control.

The marination of hams and larger meat portions has been enhanced by the injection of marinade before pickling in a marinade solution as set forth in U.S. Pat. No. 4,038,426 to K. Jesperson et al issued Jul. 26, 1977.

However, there is a deficiency in the prior art relating to the quality control of marinated meat products. Thus, because of varying portions, sizes of products, pressures, tumbler speeds, processing times, etc., it is extremely difficult to get a product consistently marinated the same way with every batch. This is particularly true when each product must be separately injected with marinade, since the percentages of marinade absorbed by the meat cannot be held constant for different sizes and or shapes of meat products.

Commercial methods must be capable of being carried out in a mass production environment simply, fast, at low cost, and with unskilled labor. Also, simplified capital production equipment is a significant requirement, both because of cost and maintenance. Complex tumbling equipment may be inoperable a large percentage of the time due to routine cleaning and maintenance and for repairs due to catastrophic failure. Furthermore, critical timing and operational procedures readily vary product quality, and may require careful and skillful attention by skilled labor.

Others have recognized that it is desirable to provide precooked meat products that resemble fried or baked products after mere warming by the end user. U.S. Pat. No. 4,199,603 to D. R. Sortwell issued Apr. 22, 1980 recognizes the failure of frozen food products, when oven or microwave cooked, to have the preferred appearance of fat-fried products. However, he resorts to a different kind of breading coating laced with oils and starches, and thus only produces a variation of a breaded product. Other patents relating to special breading mixtures for glazing or simulating roasted poultry appearance, including U.S. Pat. No. 4,367,242 to G. W. Jarvis et al issued Jan. 4, 1983 and U.S. Pat. No. 3,653,924 to E. W. Penton issued Apr. 14, 1972, also suffer from the deficiency that they require oils and starches which leads to a resulting reduction of nutritional value.

Other attempts have been made to provide product features for frozen chicke, and the like that enhance flavor and quality. U.S. Pat. No. 3,078,172 to L. L. Libby issued Feb. 19, 1953, teaches freezing uncooked chicken and batter and including oils and starches in the special batter constituency.

SUMMARY OF THE INVENTION

The present invention improves the state of the art in commercial production of meat and poultry products by providing improved quality control and consistency in the flavor and appearance of poultry products. The invention provides a controllable quality frozen meat and poultry product line that has precisely controlled flavoring and excellent appearance when warmed from frozen state in a microwave oven for immediate serving. The invention also provides dietary product lines with lower calorie, lower fat and lower starch content without sacrificing appearance, flavor or tenderness. A frozen precooked portion sized meat or poultry serving is provided which is ready to take from the freezer directly into an oven or microwave for warming and serving and presents an appetizing appearance, which in the case of chicken portions for selected product lines, is much like that of roasted and golden browned chicken.

Meat pieces, such as poultry products of serving portion size, are flavor coated with a glazing layer substantially free from starches and oils, precooked, and frozen for quick warm-up to serving temperatures in baking ovens (including microwave ovens). This invention provides several advantageous product characteristics including: (a) moist flavorful meat texture throughout, (b) preservation in frozen form, (c) precooking for serving quickly by warming-up to serving temperature, (d) preparation for appetizing appearance (e.g., golden brown chicken coloring as in roasted chicken), (e) unbreaded outer glazed surface substantially devoid of starches and oils, (f) spices and flavorings of various choice for different lines of controlled consistency and quality that are stable during preparation, freezing and warming phases, (g) tender moist texture throughout that is not dehydrated in the frozen state, and (h) exact proportions of ingredients added in the preparation for flavoring and appearance.

In the preferred embodiment, a serving portion sized meat product, typically a poultry part such as a chicken wing or breast, is marinated to impregnate the edible meat throughout with liquid marinade of more than 5% by weight. This makes the product moist, tender and tasty without dryness typically present in a chicken breast, for example. Immediately after marination, a mixture of spices, flavorings and adhesion ingredients is rubbed into the product outer surface to form a very thin coating of substantially uniform thickness. Preferably, this is a dry mixture directly rubbed into the surface of the marinated product. When the product is tumbled in marinade, myosin protein is forced to the surface of the meat creating a texturized body with an adhesive character on the surface for retaining the dry mixture. The rubbing of the dry spice mixture into this adhesive surface provides a substantial penetration of the coating layer into the surface layer of the meat for excellent bonding and uniform thickness.

The flavoring and uniform product quality is precisely controlled by two processing steps (the marinating step and the rubbing step). In the marinating step, the amount of liquid marinade solution desired, such as 5% to 12% by weight of the product, is metered into a tumbler and is tumbled until all the liquid is absorbed into the product. The second, rubbing step tumbles a measured quantity of dry powder mixture of spices, flavoring, proteins, and sugar solids, devoid of starches and oils, into the adhesive protein outer surface of the meat until the powder is uniformly rubbed into the outer surface of all the meat portions being tumbled.

The coated product then is much lower in calories and has no starches or oils which are in breadings. This coating is baked in place while the product is cooked, typically for 6 to 25 minutes in a 475° F. dry heat oven, and imparts a permanent outer texture and appearance (typically for chicken parts, a golden brown of the nature produced when poultry is roasted is imparted). The product is then frozen for preservation until serving, when it is simply warmed throughout to serving temperature in an oven or microwave. The surface glazing coating is stable through the various processing stages, and serves to seal in the marinade moisture so that it does not escape in the frozen state by dehydration. The glazing coat imparts an appetizing coloring that has formerly required breading fried in hot fat. Thus, a quality controllable and microwave heatable serving sized product is provided that is acceptable in appearance and carefully controlled in flavor, tenderness and texture.

This invention provides a method of coating meats such as poultry parts with coatings that enhance the flavor and appearance of the parts without requiring frying. In particular, the method provides high quality appetizing frozen, precooked, ready to heat and eat poultry parts. The resulting coating is a thin glaze of a desired color similar to that of roasted poultry, for example, devoid of breading and fats, yet containing and sealing thereunder special spices and flavorings that flavor the poultry itself without confinement in just the breading.

These results are obtained by including sugar solids or other carriers in a thin coating placed on raw meat portions and baking it in place as a glaze coating in an oven hot enough to color the coating to a natural roasted appearance. The coating adheres firmly for subsequent freezing and reheating steps, Equipment for the coating process comprises simply a rotary tumbler, preferably with a vacuum pump, in which the product with a moist adhesive layer is resident for tumbling with a coating mix having dry powdered ingredients including spices that are soluble in the moist adhesive layer. In part, flavoring is interspersed throughout the meat portion by marinating in the tumbler before the coating step. The resulting massaging brings out the natural myosin proteins to the surface to serve as the moist adhesive coating that retains powdered spices and flavorings. The coating spices then enhance the flavor and penetrate into the surface of the meat, particularly when further tumbled in the presence of subatmospheric pressures, and is thereafter sealed in place by glazing the coating in a hot dry heat oven. The coating mixture therefore contributes both a predominant outer coloring and a predominant flavoring desirable for any particular product line.

A method of quality control of the flavor and texture of meat products such as chicken parts in accordance with a feature of the present invention comprises the steps of:
placing a batch of unseasoned raw meat products having substantially similar sizes and shapes into a rotatable tumbler,
establishing a batch weight for the products in the tumbler,
partially filling the tumbler containing the products with a predetermined amount of liquid marinade equal to a desired percentage of the weight of marinade to be contained in the finished products and leaving there above an air space,
reducing the air space pressure inside the tumbler to below atmospheric, and
rotating the tumbler at speeds permitting the products to alternately reside in the liquid marinade and be carried out by the tumbling action into the reduced pressure air space until substantially all the marinade is absorbed by the products, thereby establishing a fixed percentage of marinade to product weight substantially equally distributed throughout the products over an extensive range of variation of produce and process parameters. The method may include the step of measuring predetermined amounts of marinade and raw unseasoned meat portions into the tumbler, and mixing the products intimately together in a reduced pressure air atmosphere until all of the marinade is absorbed by the meat portions.

An important step of this coating process is the provision of a percentage of sugar solids in the dry powder mix applied to the raw meat surface, thus producing (when baked at high temperature dry heat) a natural looking roast meat coloring which is retained during subsequent freezing and reheating cycles.

Quality control of meat and poultry parts provides for tumbling batches of products of substantially similar sizes and shapes, such as chicken breast portions, D the presence of a controlled amount of additives. Such parts are marinated in a measured amount of marinade in a rotating tumbler with an air space at pressure reduced from atmospheric. The tumbler is rotated at such speeds that the meat parts are carried out of the marinade into the reduced pressure air and separated from the other parts so that the entire surface of all products is exposed to the reduced pressure air to condition the products for absorbing the marinade uniformly. The parts absorb the marinade fully when dropped back into the marinade. This procedure is repeated for a number of tumbling cycles. The parts are preferably raw unseasoned meat portions of sizes which can be served in individual meal entrees, so that tumbling can be completed in a few minutes.

The products, thus conditioned to absorb the marinade, will not have spotty or local absorption centers, but rather, uniformly absorb the marinade over their entire surfaces. However, the amount of marinade absorbed is still variable depending upon many factors such as meat texture and moisture, time of rotation, temperature, pressure, etc., all of which can change from batch to batch. It is preferable for tenderization to marinate uncooked poultry or meat products. The present invention provides batches of similarly sized meat portions marinated to have uniform marination, even though the moisture content, texture or shape of the portions change considerably from batch to batch.

This is achieved simply and reliably by metering out predetermined amounts of marinade into the tumbler for the batch of meat products, such as 10% by weight, and tumbling under the above-described conditions until substantially all the marinade is absorbed into the products.

A variety of differently flavored product lines may be produced by simply varying the coating mix spices and flavorings. Ethnic flavorings such as hot Mexican, oriental teriyaki, Indonesian curry, etc. are exemplary.

The process is particularly suitable for preparation of portion sized frozen precooked meat entrees, ready to heat and eat. Thus, poultry parts of uniform size and shape, such as breasts or wing joints, may be very quickly and economically processed in simple equipment with consistent results that will assure the same taste, appearance and quality from batch to batch, even when many manufacturing variables are encountered such as variations in temperature, moisture, size, shape, fat and presence of skin, etc.

BRIEF DESCRIPTION OF THE DRAWINGS

These and other features and advantages of the present invention will be better and more completely understood by referring to the following detailed description of presently preferred exemplary embodiments in conjunction with the appended sheets of drawings, of which.

DETAILED DESCRIPTION OF PRESENTLY PREFERRED EXEMPLARY EMBODIMENTS

Figure 1:
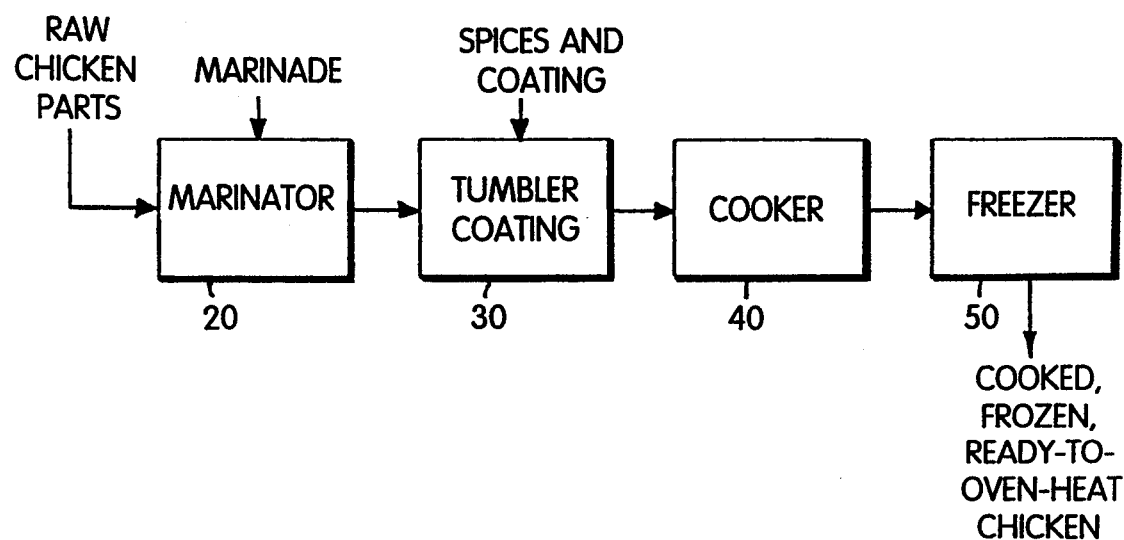
FIG. 1 is a block diagram of the presently preferred exemplary embodiment of a poultry processing system in accordance with this invention.

FIG. 1 is a block diagram of the presently preferred exemplary embodiment of a poultry processing system in accordance with this invention. Briefly, raw chicken parts are marinated within a marinator by a marinating step 20. The marinated parts are then tumbled with spices and coating to form a coating (step 30). The resulting parts are cooked by a cooker at step 40, and frozen by a freezing step 50. Cooked, frozen, ready to heat and eat chicken parts result.

Figure 2:
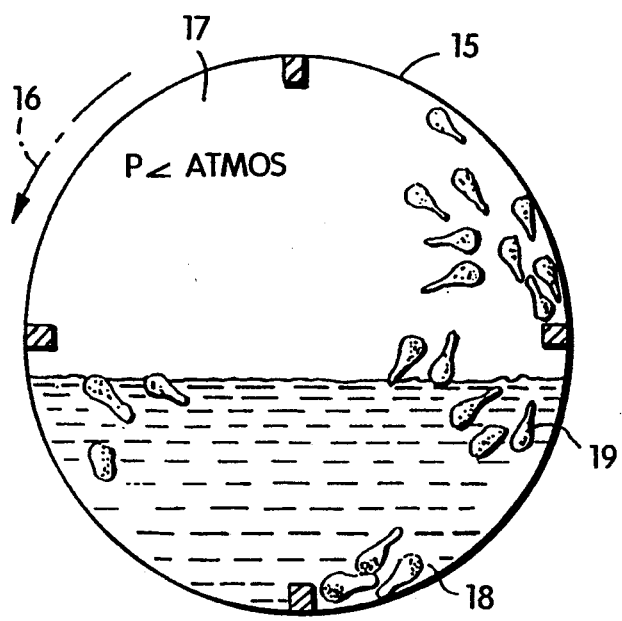
FIG. 2 is a diagrammatic end section view of a rotating tumbler drum for marinating and coating meat products in the preferred embodiment.

As may be seen from tl drawing, FIG. 2 shows the simple rotating drum tumbler used in the marinating and coating steps 20, 30 shown in FIG. 1. Thus, in the marinating step 20 the tumbler drum 15 of about one meter diameter rotates as indicated by arrow 16 in FIG. 2 at about 2 RPM with a marinade 18 therein and a batch of meat products, such as chicken portions 19. The drum is only partly filled with marinade 18 to leave an air space 17 thereabove which is evacuated to a pressure below atmospheric when the drum is rotated to marinate a batch of meat products (which are typically meal sized portions).

The internal drum pressure is important, since the meat portions to be marinated come from the atmosphere and thus contain air in the capillaries and tissues which can block the quick entry of the marinade. Thus, typically s pressure below atmospheric such as 0.6 to 0.8 Bar is maintained in the tumbler when the marinating is taking place, thereby removing the air from the meat products and letting it be replaced quickly by absorbed marinade.

As seen from FIG. 2, the poultry pieces 19 are rotated out of residence in the marinade and are allowed to fall through the reduced pressure so that their whole surfaces are exposed before being reintroduced into the marinade. This takes place over several cycles. The drum rotation therefore is such that the parts 19 are not held by centrifugal force against the outer wall, but will be pulled off by gravity as they near the top of their travel path. Otherwise, closely packed parts 19 would tend to have only the outermost exposed local regions exposed to the reduced pressure atmosphere and would not tend to be uniformly penetrated by the marinade.

As explained above, it is desirable to have every part and every batch uniform for quality control purposes. To overcome all the possible variations encountered (such as moisture content of the meat, pressure variations from batch to batch, different meat textures, etc.,), it has been found that the uniformity is very simply controlled by metering out the amount of meat in each batch and the marinade—thus controlling the amount of materials in the tumbler. The materials are then tumbled until the entire amount of marinade is absorbed by the meat, Whatever the variables, the amount of absorbed marinade per pound of meat remains constant.

In a typical example, 100 lbs. of raw chicken breasts or wing joints and 10 lbs. of marinade were rotated at 2 RPM in a 1-meter diameter drum for between 6 and 25 minutes until all the marinade was absorbed. The chicken parts then weighed 110 lbs., and the meat moisture content was substantially uniform throughout. The barometric pressure was 0.7 Bar during the rotation.

The marinade solution may vary, of course, to give appropriate flavor or tenderness, etc. The amount of marinade is precisely controlled by metering out the exact quantity desired, such as 10% by weight (and preferably more than 5% by weight), into the rotating tumbler and tumbling until the liquid marinade is completely absorbed into the products, leaving the surface sticky with the myosin proteins generated by the tumbling. The massaging action of the marinating process effected in this manner, as taught by the above-mentioned U.S. Pat. No. 4,038,426, results in the coating of the meat with a congealed layer of viscous protein. This constitutes a preferred moist adhesive coating on the poultry parts being processed. When a dry powdered mixture of spices, flavoring and coating ingredients is added and the chicken parts tumbled for a few minutes, a uniformly disposed coating layer adheres to the outer surface of the product.

For the coating step 30 shown in FIG. 1, the same simple drum may be used after the marinade is all absorbed, by adding the spices and coating mixture. A new tumbling cycle is started with a precisely measured quantity of additive spices and flavorings in the binding protein-sugar solid glazing layer base material, so that the additives may be uniformly rubbed over the entire product surface and be impregnated into the surface layer of the product. Some penetration (as in the marinating step 20) of the spices and flavoring into the body of the chicken parts occurs.

In the preferred embodiment, the coating mix contains flavoring and spices, dextrose and sugar solids. A predominant coloring agent in the coating mix may be in the form of the sugar solids. The preferred coating mixture is devoid of any fats and starches for dietary purposes. These ingredients, with the protein, produce a glaze coating when cooked in the cooking step 40 show in FIG. 1. This glaze coating elastically covers the surface and seals in the spices and flavoring and firmly adheres during subsequent freezing and reheating cycles.

This raw glazing layer is then cooked with the product in a dry oven atmosphere (step 40) to bake it in place where it becomes more impermeable, thereby sealing in the marinade liquid so that it is more difficult to dehydrate the meet in the freezing process and the storage in the frozen state. The chicken parts are preferably heated by baking for about 10-20 (6-25) minutes in a dry oven at high temperature, such as 475° F. The raw chicken is cooked by this cooking step.

With its sugar solid content, the glaze coating is very thin and is thus browned until it establishes the predominant color of the chicken to be similar to roast chicken, providing a highly attractive and appetizing appearance (the spices and flavoring included in the glazing can influence the color of the product). The sugar solid content of the coating mix is preferably in the order of 25% by weight, with the remainder being flavoring ingredients.

Figure 3:
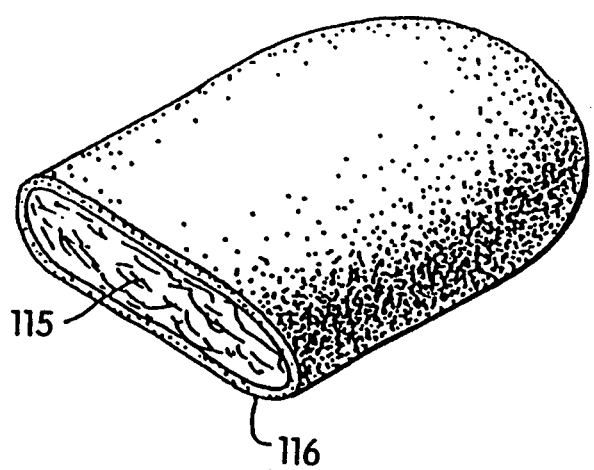
FIG. 3 is a part-sectional sketch in perspective of a boneless shaped meat product, such as a chicken breast, provided by this invention.
Figure 4:
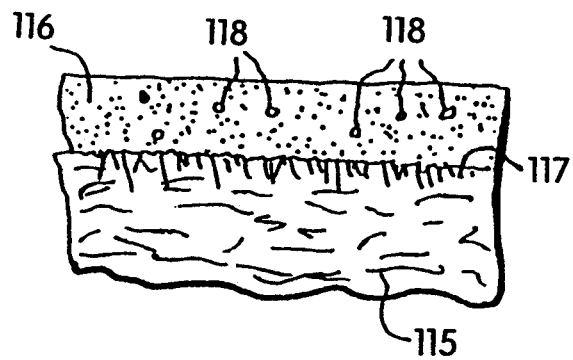
FIG. 4 is a fragmental sketch in section view on enlarged scale showing the intersection between a glazed coating layer and the meat product.
Figure 5:
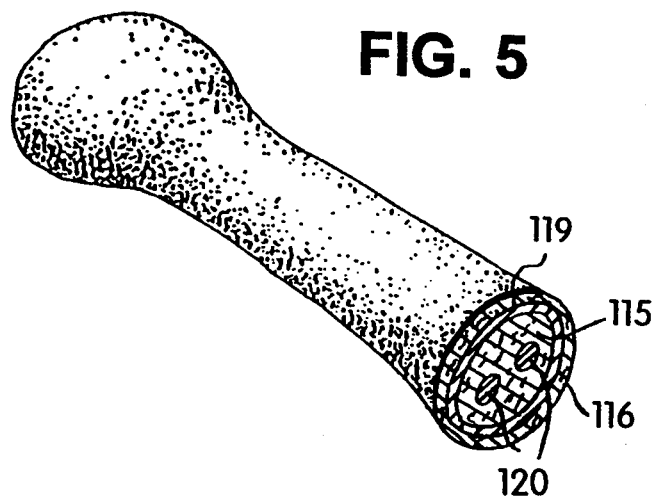
FIG. 5 is a part-sectional perspective sketch of a meat product, such as a chicken wing portion having a bone therein, provided by the invention.

As may be seen from FIGS. 3-5, the product provided by this invention basically comprises an edible meat product of a size and shape for serving as a meal entree or snack having an internal meat body 115 with a glazed surface coating 116 over its entire external surface. Typically, the product in FIG. 3 is a shaped chicken breast which can be served as a chicken steak (i.e., the part may be preshaped to have a shape different from its natural shape).

The product has properties provided in its preparation and determinable from its physical characteristics which make it ideally adapted for a frozen product line that can be fast served by warming to a serving temperature in an oven or microwave without requiring deep fat frying. The product is precooked and is prepared with an appetizing appearance in the outer glazed coating 116 that is stable through cooking, the freezing process, the frozen state and the final quick serve oven warming before serving. Furthermore, the product may be preflavored with appropriate seasonings, spices and flavorings to provide distinctive product line themes (such as oriental, barbecue, and curry, etc.)

A novel and desirable product feature is its dietary characteristics; namely, low calorie, low starch and low fat. This is achieved by eliminating the breading and the follow-through deep fat frying step. Accordingly, the glazing layer is low or substantially devoid of flours, starches and oils in the preferred embodiment—thereby constituting a substantially unbreaded outer surface. The glazing coating 116 therefore is a very thin layer (exaggerated as shown in the drawings), with a high percentage of proteins and associated sugar solids, spices and flavoring.

As shown in FIG. 4, the glazing layer substantially penetrates the outer surface of the meat product as identified by the lining 117. The speckling 118 represents spices and flavoring impregnated within the glazing layer and adhered to the outer product surface by the adhesive properties of the myosin protein surface layer induced thereon by tumbling before dry spice powders are added with the other glazing ingredients (including proteins and sugar solids). This glazing when baked into place in a dry oven at about 475° F. is more intimately secured in place and attains a roasted color which will remain through the following freezing step 50 and the warming step.

As shown in FIG. 5, for the chicken wing section the glazing is deposited over the skin layer 119. The inedible bones 120 (on this particular product, a drumstick or the like) are included in the product and are discarded after serving and eating the edible meat.

Various flavorings and glazing mixtures may be employed. As mentioned above, the product is preferably premarinated, and various marinades may by used for tenderizing and flavoring. It is essential for quality control, however, that the amounts of marinade and flavorings be precisely controlled for any product line or flavor, so that the internal meat is uniformly marinated.

Several kinds of product lines of different featured flavors can readily be produced in this manner. Thus consider the following examples:

For an oriental teriyaki line, soy sauce powder, onion and garlic powder may constitute typical ingredients.

For a hot Mexican flavoring, hot pepper powders and paprika may be used.

For Indonesian flavoring, curry powder may constitute the main flavoring ingredient.

Citric acid, lime or lemon flavoring may be used. Not all ingredients need be powdered, but since the myosin protein adhesive coatings are water soluble, it is preferable to use dry powder mix ingredients to prevent dilution or loss of the adhesive and key coating constituent.

Cheeses may be used for Italian flavoring ingredients.

Other lines may use sour cream powder, tomato powder, celery salt or proprietary spice mixtures.

Since the weight of the chicken parts (110 lbs.) following the marination step is known, it is again a simple step to assure uniformity of flavoring by simply metering out a predetermined amount of a premixed additive powder mix. The coating provided by the invention has distinctive advantages of quality control and cosmetic beauty, and also is securely adhered in place to ruggedly withstand freezing, storage in frozen state and reheating. In particular, the products may be reheated to serving temperature in microwave ovens, and still have the appearance of roasted chicken. The appearance is particularly good for chicken products, and those having skin thereon, but also provides for other meats a natural and appetizing browned appearance even with microwave warm-up for a short time period.

A readily reproducible product quality is provided that may be maintained under all kinds of unusual processing conditions without experienced or skilled labor and with simple processing equipment comprising a mixer such as a rotating tumbler.

The following detailed examples provide preferred preparation steps for the products, in exemplary flavors, for explicit product lines. Variations including the addition of flavorings such as soy sauce in paste or liquid form rather than in powder form to the glazing mixture are, of course, possible. It is essential in the preferred embodiment, however, to substantially eliminate the starches, flours and oils from the glazing layer.

EXAMPLE 1

To provide an oriental or teriyaki flavored chicken portion, the primary ingredients for the glazing mixture in dry powder form are: dextrose; corn syrup solids soy sauce powder; spices; and the natural myosin proteins described above.

EXAMPLE 2

Curry powder may be substituted in the mixture of Example 1 for the soy sauce powder. Other such substitute flavors and spices may be used as desired, including cheeses, peppers, garlic or onion salts, etc.

EXAMPLE 3

As above, wherein the products are impregnated by 10% by weight of a liquid marinade solution, by metering product and marinade weight into a rotating tumbler and tumbling until all the marinade is absorbed into the products.

EXAMPLE 4

As described above, with the meat product cooked in a baking oven at a temperature of about 475° F. for from 8-120 minutes, or until the glazing coating attains the desired final coloring.

EXAMPLE 5

Same as Example 4 wherein the products are chicken parts and the final coloring simulates the golden brown of roasted chicken.

EXAMPLE 6

Same as Example 4, wherein the products are frozen and stored in frozen state until ready to serve, and are then warmed to serving temperature in a microwave oven. They resemble toasted chicken in color, appearance and taste.

EXAMPLE 7

Same as Example 6, except warming in deep fat.

The product has similar color, appearance and taste, but has a thin oil layer which adds calories. It is therefore evident that this invention provides a novel and superior product line affording dietary characteristics, high quality control of flavoring and preparation, a variety of product characteristics for differing product themes and lines, excellent appearance and flavor, and better preservation in the frozen state.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of processing poultry parts to provide an unbreaded food product, said method comprising the following steps:
   - exposing said parts to a quantity of marinade such that at least a portion of the marinade is absorbed into the parts and the outer surface of the parts has an adhesive myosin muscle protein binder coating disposed thereon; and
   - applying to said parts a coating mixture including sugar and spices, said coating mixture combining with said myosin muscle protein binder coating to form a non-breaded glazable outer coat, said glazable outer coat glazing upon cooking to create a generally uniform color.

2. The method as claimed in claim 1 wherein said exposing step includes tumbling in the presence of said quantity of marinade until all of said quantity of marinade is absorbed into the parts.

3. A method of processing poultry parts to produce an unbreaded food product, said method comprising the steps of:
   - tumbling raw poultry parts in an amount of marinade solution until at least a portion of said marinade solution is absorbed by said parts and the surface of said parts develops an adhesive binder layer of myosin muscle protein; and
   - thereafter applying a coating mixture to said surface of said parts, said coating mixture including sugar, said coating mixture combining with said adhesive binder layer, which coating mixture forms with said adhesive binder layer a non-breaded outer sealing layer of glazing substances.

4. A method as in claim 3 wherein said coating mixture consists essentially of a finely divided dry mixture of natural sugar solids, spices, coloring agents, and flavoring agents.

5. The method as in claim 3 wherein said formed adhesive binder layer is thin and firmly adherent.

6. The method as in claim 3 wherein said method further comprises baking the parts at about 475° F. for 6-25 minutes.

7. The method of coating poultry parts as claimed in claim 3 including the additional steps of cooking and then freezing said parts, and retaining the marinade within the parts by means of the glazed coating in the frozen state.

8. The method as claimed in claim 3 wherein said coating mixture contains at least about 25% natural sugar solids and dextrose based upon the total weight of said mixture.

9. The method as claimed in claim 3 wherein said tumbling step includes tumbling said parts with said amount of marinade solution under vacuum.

10. A marinated, unbreaded coated poultry meat product comprising a poultry meat body impregnated with liquid marinade brine and an outer glazing coat formed from an external intrinsic moist myosin adhesive binder layer and a coating including sugar and a flavoring agent, said outer glazing coat, upon cooking, forming a non-breaded colored glazed layer for sealing in the impregnated liquid marinade brine in the meat product.

11. An unbreaded poultry product prepared from poultry parts for freezing for preservation, comprising, an interior poultry meat core with an outer surface glazed layer adhering to and generally sealing the outer surface of the poultry meat in the frozen state, which layer has a substantially unbreaded outer surface and comprises myosin proteins, sugar, and spices and/or other flavoring agents.

12. A marinated unbreaded meat product prepared from serving sized portions of meat, to be preserved in a frozen state, comprising in combination, a frozen meat product in which said portions are impregnated by a liquid marinade, and an outer non-breaded surface glazed layer, said non-breaded glazed layer comprising a mixture of myosin protein and sugar.

13. The method of processing raw meat parts to produce an unbreaded food product, said method comprising the following steps:
   - providing on the outer surface of the raw parts a thin, edible protein adhesive binder coating; and
   - further coating said coated parts with a non-breaded coating mixture including sugar and flavoring agents to form a thin, firmly adherent non-breaded outer glazing coat, said coating mixture serving to create a generally uniform color upon cooking.

14. The method as claimed in claim 13 wherein said providing step includes tumbling said raw parts in a marinade brine until all the marinade is absorbed in the parts.

13

15. The method of processing poultry parts to provide an unbreaded food product, said method comprising the following steps:
 (a) tumbling uncooked poultry parts in a marinade solution for a period of time until said marinade solution is substantially absorbed by said parts and a moist viscous myosin protein coating is formed thereon; and
 (b) thereafter tumbling said parts in contact with a coating mixture including sugar and flavoring materials, said coating mixture combining with said moist myosin coating to thereby form an adherent continuous non-breaded outer glazing layer.

16. A method as in claim 15 including the additional steps of cooking and thereafter freezing said parts.

17. The method as claimed in claim 16 including the step of reheating the frozen glazed parts in a microwave oven for serving without a change of coloration.

18. The method as claimed in claim 15 wherein said tumbling step (a) includes marinating the parts substantially uniformly throughout.

19. The method as claimed in claim 15 wherein said poultry parts are similar chicken parts of similar size proportions in which the tumbling step (a) marinates the parts substantially uniformly throughout.

20. The method as claimed in claim 15 wherein said poultry parts are chicken parts with skin on of similar size proportions and wherein the parts are marinated by said tumbling step (a) to substantially uniformly distribute the marinade solution throughout the parts.

21. The process as claimed in claim 15 wherein:
 said method further includes the step of providing added proteins in the coating mixture.

22. A method of processing raw poultry parts to provide an unbreaded food product, said method comprising the following steps:
 marinating said parts with a quantity of marinade so that at least a portion of the quantity of marinade is substantially absorbed into the parts and the outer surfaces of the parts are coated with an adhesive myosin muscle protein binder coating; and then
 coating said parts with a further coating including sugar and flavoring agents, said myosin muscle protein binder coating and said further coating forming a non-breaded outer glazing coat, said non-breaded outer glazing coat serving to create desired color of said coated parts upon cooking.

23. A method of processing raw poultry parts to provide an unbreaded food product, said method comprising the steps of:
 introducing raw poultry parts into a container;
 introducing a quantity of marinade into said container;
 moving said parts within said container until at least a portion of said marinade is absorbed into the parts and the outer surface of each part has an adhesive myosin muscle protein binder coating disposed thereon;
 providing a quantity of coating mixture including sugar and flavoring agents, said coating mixture being combinable in said myosin muscle protein binder coating; and
 applying said coating mixture to said binder coated parts, including the step of forming with said binder coating and said coating mixture an outer non-breaded glazing coat on the outer surface of each part, said glazing coat browning upon cooking to form a glazed coating.

14

24. A process for preparing unbreaded poultry products comprising the steps of:
 disposing a quantity of poultry parts into a chamber;
 adding a quantity of marinade solution to said chamber;
 moving said parts within said chamber until at least a portion of said marinade solution has been absorbed by said parts and a layer of myosin protein coats said parts;
 providing a coating mixture combinable with said myosin protein layer, said coating mixture including sugar and at least one flavoring agent; and
 coating said myosin protein coated parts with said coating mixture thereby forming with said protein layer and said mixture an adherent glazing coat on the outer surfaces of said parts, said glazing coat browning upon cooking to form a non-breaded glazed coating.

25. A process as in claim 24 wherein said sugar comprises dry sugar solids and dextrose.

26. A process as in claim 24 wherein said coating mixture is powdered.

27. A method of processing a poultry part comprising:
 (a) causing said poultry part to exude a myosin protein layer on an outer surface thereof; and then
 (b) applying sugar to the outer surface of said poultry part, said myosin protein layer adhering said sugar to said outer surface so as to form a non-breaded outer glazing coat.

28. A method as in claim 27 wherein said step (a) includes the steps of:
 marinating said poultry part with a liquid brine marinade; and
 rubbing said poultry part with other poultry parts.

29. A method as in claim 27 further including the step of heating said outer glazing coat so as to form a browned glazed coat.

30. A method as in claim 27 including the subsequent step of transforming, by cooking, said glazing coat into a browned glazed coat, said glazed coat retaining moisture within said poultry parts.

31. A method as in claim 27 wherein said applying step includes the step of applying spices and/or other flavoring agents to said outer surfaces.

32. A method as in claim 27 wherein said applying step comprises applying a dry mixture of sugar and spices to said poultry part outer surface.

33. A processed poultry part comprising a meat core having, on an exterior surface thereof, a non-breaded outer glazing coat comprising myosin protein and sugar, said myosin protein causing said sugar to adhere to said exterior surface.

34. A method of processing poultry meat comprising:
 (a) forming a sticky myosin protein coating on an outer surface of said poultry meat; and
 (b) applying a substance including white sugar to said poultry meat such that said substance and said sticky myosin protein coating together form a non-breaded layer that at least partially adheres to said outer surface of said poultry meat,
 wherein no breading is applied to said poultry meat.

35. A method as in claim 34 wherein said white sugar comprises dextrose.

36. A method as in claim 34 wherein said substance comprises a dry mixture including said white sugar and flavoring agents, and said applying step (b) comprises applying said dry mixture to said poultry meat outer surface.

37. A method as in claim 34 further including applying heat to said layer so as to at least partially brown said layer so as to resemble roasted chicken.

38. A method as in claim 34 wherein said forming step (a) includes marinating said poultry meat in a vacuum tumbler.

* * * * *